United States Patent [19]

Anderson et al.

[11] 3,843,766

[45] Oct. 22, 1974

[54] METHOD OF REPROCESSING NUCLEAR FUELS

[75] Inventors: Robert N. Anderson, Palo Alto; Norman A. Parlee, Los Altos Hills, both of Calif.

[73] Assignee: The United States of America as represented by the Secretary of the Navy, Washington, D.C.

[22] Filed: Dec. 9, 1969

[21] Appl. No.: 883,498

[52] U.S. Cl..................... 423/11, 176/37, 176/49, 423/5
[51] Int. Cl...................... C01g 43/00, G21c 19/28
[58] Field of Search ............ 23/327, 328, 333, 339, 23/342–344, 347; 176/37, 49; 423/11, 5

[56] References Cited
UNITED STATES PATENTS

| | | | |
|---|---|---|---|
| 3,034,889 | 5/1962 | Spedding et al. | 23/342 |
| 3,287,093 | 11/1966 | Nelson et al. | 23/347 |
| 3,485,594 | 12/1969 | Knacke | 23/324 |

OTHER PUBLICATIONS

ANL–6648, 1962, pp. 15, 31, 40, 43, 44, 60–64, 80, 110, 111, 115.

*Primary Examiner*—Harvey E. Behrend
*Attorney, Agent, or Firm*—R. S. Sciascia; Charles D. B. Curry

[57] ABSTRACT

A method of dissolving spent metal nuclear fuel in tin and precipitating out a uranium nitride, free of the fission products, by reaction of the uranium contained in the spent fuel with nitrogen. The uranium nitride is then heated and subjected to a vacuum to remove the nitrogen and leave only the pure uranium.

7 Claims, 1 Drawing Figure

3,843,766
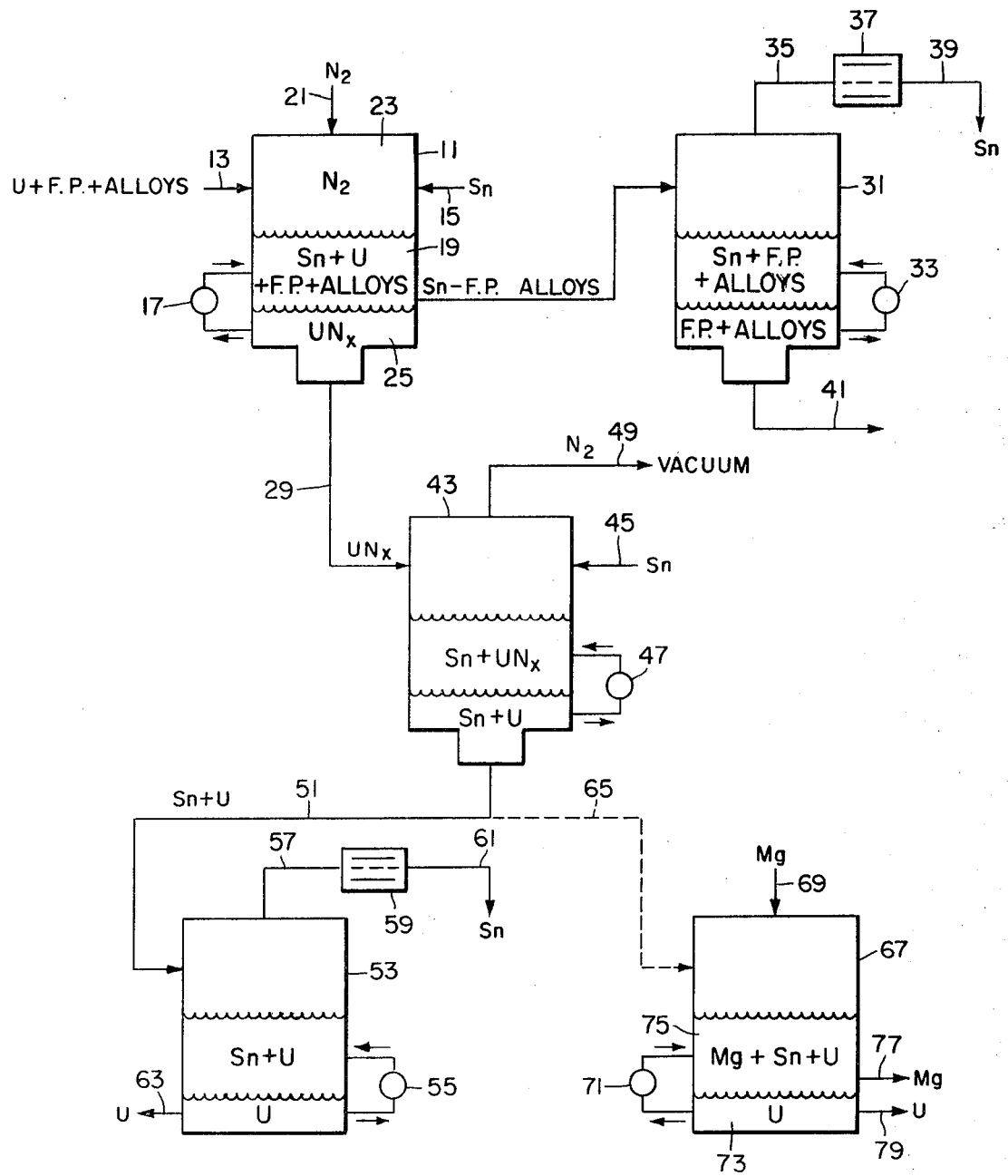
INVENTOR
*ROBERT N. ANDERSON*
*NORMAN A. PARLEE*
BY *Charles P L Curry*
ATTORNEY

METHOD OF REPROCESSING NUCLEAR FUELS

The invention described herein may be manufactured and used by or for the Government of the United States of America for governmental purposes without the payment of any royalties thereon or therefor.

Current fuel reprocessing methods involve wet-chemistry separations that require long periods of cooling for the radioactivity to decay, and a complex series of slow chemical separations (by complexing, chelation and ion exchange), with the generation of considerable quantities of radioactive wastes. Pyrometallurgical methods are fast, do not require the long cooling period, and have only small volumes of waste generated. However, separation reactions with molten metals are complicated in that those metallic fission product elements less chemically reactive than the metal to be recovered are difficult to separate. Complicated extraction schemes employing liquid metal or molten salt solvent extraction, or conversion to the fluorides and distillation of uranium hexafluoride have been proposed. However, liquid metal or molten salt extractions lose a significant amount of the fuel material in the process and fluorine reactions require working with toxic and corrosive gas requiring expensive equipment.

Accordingly, an object of the present invention is to provide a method for inexpensively and efficiently removing fission products from metal nuclear fuels.

Briefly, the present invention relates to a process of dissolving a metal fuel, for example, uranium, into a suitable solvent metal and precipitating out the metal fuel, free of the fission products, by reaction with nitrogen to form an insoluble nitride. The particular solvent metal is one in which the fuel metal is relatively soluble at the reaction temperature. More specifically it has been discovered that uranium can be separated from all fission products by dissolving the uranium and fission products in tin (3 to 5 percent Uranium solution) and precipitating uranium nitride ($UN_x$) by nitrogen at one atmosphere and at temperatures of from about 500° C to about 1,500° C. The precipitation of the uranium nitride is continued until the concentration of the uranium in the tin solution is sufficiently reduced that its activity approaches that of the fission products at which time co-precipitation occurs.

Since, in typical fuel reprocessing situations, the concentration of the fission products is much lower (typically by 1 to 2 orders of magnitude) than the fuel metal, 90 percent or more of the uranium can be recovered before co-precipitation occurs depending upon the initial fission product composition and concentration. Stopping the reaction before co-precipitation insures a clean product.

The uranium nitride in the presence of tin may be then heated and subjected to a vacuum to remove the nitrogen and leave only the uranium dissolved in tin. The tin may be then removed by distillation leaving pure uranium.

Other objects, advantages and novel features of the invention will become apparent from the following detailed description of the invention when considered in conjunction with the accompanying drawing wherein:

In the drawing is illustrated a schematic diagram of a processing system for separating uranium from spent metal nuclear fuels in accordance with the method of the present invention. As illustrated in the drawing the spent uranium fuel enters vessel 11 of the processing system through conduit 13. Vessel 11 contains molten tin ($S_n$) which is schematically shown as being introduced into vessel 11 through conduit 15. It is to be understood that the tin and spent uranium fuels may be introduced into vessel 11 in either solid or liquid states and by any suitable handling techniques. Once the tin is in vessel 11 it, and any spent fuel contained therein, is maintained in the liquid state by means of reboiler 17 at a temperature of from about 500° to about 1,500° C, the lower limit of about 500° being set by the melting point of the uranium tin alloy. The upper limit is determined by the amount of allowable evaporation of the tin.

The spent uranium fuel includes uranium (U), fission products (F.P.) and various alloy metals. These materials are readily soluble in liquid tin, their solubility increasing at higher temperatures. This tin melt is indicated by reference numeral 19.

In accordance with the method of the present invention nitrogen gas ($N_2$) is introduced into vessel 11 through conduit 21 at about one atmosphere of pressure and is indicated as occupying section 23 of vessel 11 which is over the upper surface of melt 19. It is to be understood that this is only a schematic illustration and it may be preferable to introduce the nitrogen directly into melt 19 in order to achieve better contact between the nitrogen gas and the melt. In accordance with the present invention it has been discovered that the nitrogen gas reacts with the uranium to form a solid uranium nitride ($UN_x$) as indicated by reference numeral 25.

The reaction between the uranium (U) and the nitrogen ($N_2$) resulting in the precipitation of uranium nitride ($UN_x$) may be continued until the concentration of the uranium (U) in the melt 19 is sufficiently reduced that its activity approaches that of the fission products (F.P.) and then co-precipitation occurs. Since the concentration of the fission products (F.P.) is usually much lower (one or two orders of magnitude) than the uranium (U), 90 percent or more of the uranium (U) can form uranium nitride ($UN_x$) before co-precipitation occurs. Stopping the reaction before co-precipitation occurs insures a clean uranium nitride (UXX) precipitate.

After the reaction has been stopped then the melt or solution of tin (Sn) plus fission products (F.P.) and alloys are removed through conduit 27 for further processing or for waste discharge. It should be noted that the solution discharged through conduit 27 is shown as containing no uranium (U). However, in practice it will contain some uranium (U) but it is a small amount and may be discharged as waste or reprocessed by being reintroduced into vessel 11 through conduit 13.

After the reaction is completed the uranium nitride precipitate ($UN_x$) may be removed through conduit 29 for further processing. In practice, it may be preferable that the unreacted solution be first removed from vessel 11 through conduit 27, and then the uranium nitride precipitate ($UN_x$) removed from vessel 11 by conventional mechanical techniques such as by scoops or the like.

The waste solution in line 27 is transferred to vessel 31 where it is maintained in the liquid state by reboiler 33. Reboiler 33 maintains the waste solution at a temperature of sufficient value so that the tin in vessel 31 will boil depending upon the particular pressure employed. For example, at a partial vacuum tin will boil at 800° C and at ambient pressures it will boil at a temperature of about 3,000° C. In vessel 31 the tin is vaporized and then passes through conduit 35 to the inlet of condenser 37 where it is condensed to the liquid state. From condenser 37 the liquid tin passes through conduit 39 where it is collected and then reused for processing the spent uranium metal fuel. After all of the tin has vaporized then the concentrated fission products (F.P.) and alloys that collect at the bottom of vessel 11 may be discarded as waste through conduit 41.

The uranium nitride ($UN_x$) is transferred from vessel 11 to vessel 43 where it is mixed with tin that is introduced into vessel 43 through conduit 45. The tin and uranium nitride are maintained in the liquid state by reboiler 47. Reboiler maintains this solution at a temperature of approximately 1,500° C. It has been found that at such temperature the uranium nitride ($UN_x$) readily decomposes into uranium (U) and nitrogen ($N_2$). Tin is added to the uranium nitride because, if not added, the decomposition temperature at the uranium nitride ($UN_x$) becomes excessively high.

Vessel 43 is subjected to a vacuum through conduit 49 which draws off the nitrogen ($N_2$) produced as a result of the decomposition of the uranium nitride. After the nitrogen has been removed from the uranium nitride there remains in vessel 47 only a solution of tin ($S_n$) and uranium (U).

The solution of tin and uranium in vessel 43 is then transferred through conduit 51 to vessel 53 where it is maintained in the liquid state by reboiler 55. Reboiler 55 maintains the solution at a temperature of sufficient value so that the tin in vessel 53 will boil depending upon the particular pressure employed. In vessel 55 the tin is vaporized and then passes through conduit 57 to the inlet of condenser 59 where it is condensed to the liquid state. From condenser 59 the liquid tin passes through conduit 61 where it is collected and then reused for processing the spent uranium metal fuel. After all of the tin has vaporized then the pure uranium (U) that collects at the bottom of vessel 53 is withdrawn through conduit 63 and used for any purpose for which it may be needed.

Rather than processing the uranium-tin mixture formed in vessel 43 in vessel 53, as above described, the uranium-tin mixture may be transferred through conduit 65, shown in dotted lines, to vessel 67. Vessel 67 contains molten magnesium (Mg) which is schematically shown as being introduced into vessel 67 through conduit 69. It is to be understood that the magnesium and uranium-tin mixture may be introduced into vessel 67 in either solid or liquid states and by any suitable handling techniques. The magnesium and the uranium-tin mixture are maintained in the liquid state by means of reboiler 71 at a temperature of from about 500° C to about 1200° C. This temperature range is selected because the tin must be liquid at the temperature yet the temperature not so high that the vapor pressure of Magnesium becomes a problem. The magnesium produces a two phase system, (1) a uranium (U) phase as indicated by reference numeral 73 and (2) a magnesium-tin (Mg-Sn) phase as indicated by reference numeral 75. The magnesium-tin melt is removed through conduit 77 as a waste product or it can be further processed by separating the magnesium and tin by heating and vaporizing off the Magnesium. The uranium (U) is removed from vessel 67 through conduit 79 and may be then used for any purpose for which it may be needed.

What is claimed is:

1. The method of separating uranium metal from spent metal nuclear fuels including uranium, fission products and metal alloys comprising the steps of:
   a. dissolving said spent metal nuclear fuel in a relatively large quantity of tin at a temperature of from about 500°C to about 1,500°C to form a solution;
   b. heating at a temperature of from about 500°C to about 1,500°C said solution in a nitrogen atmosphere to form a uranium nitride precipitate; and
   c. removing the nitrogen from said uranium nitride precipitate thereby leaving uranium metal.

2. The method of claim 1 wherein:
   a. said solution is heated in a nitrogen atmosphere of about one atmosphere.

3. The method of claim 2 wherein:
   a. said uranium nitride precipitate is dissolved in tin to form a tin-uranium nitride solution;
   b. heating said tin-uranium nitride solution in the presence of a vacuum to remove the nitrogen from said uranium nitride of said tin-uranium nitride solution and forming a tin-uranium solution; and
   c. removing the tin from said tin-uranium solution thereby leaving uranium metal.

4. The method of claim 3 wherein:
   a. said tin-uranium nitride solution is heated to a temperature of from about 1,000° C to about 1,500° C.

5. The method of claim 4 wherein:
   a. the tin is removed from said tin-uranium solution by heating the tin-uranium solution and boiling off the tin.

6. The method of claim 4 wherein:
   a. the tin is removed from said tin-uranium solution by dissolving said tin-uranium solution in magnesium to form a second solution; and
   b. heating said second solution to provide a uranium phase and a tin-magnesium phase.

7. The method of claim 6 wherein:
   a. said second solution is heated to a temperature of from about 500° C to about 1,200° C.

* * * * *